United States Patent
Tan et al.

(10) Patent No.: US 9,432,678 B2
(45) Date of Patent: Aug. 30, 2016

(54) ADAPTING A VIDEO STREAM

(75) Inventors: Wai-Tian Tan, Sunnyvale, CA (US); Andrew J. Patti, Cupertino, CA (US); Mitchell Trott, San Mateo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1362 days.

(21) Appl. No.: 12/916,509

(22) Filed: Oct. 30, 2010

(65) Prior Publication Data

US 2012/0106623 A1    May 3, 2012

(51) Int. Cl.
*H04N 19/40* (2014.01)
*H04N 19/58* (2014.01)

(52) U.S. Cl.
CPC ............. *H04N 19/40* (2014.11); *H04N 19/58* (2014.11)

(58) Field of Classification Search
CPC ..................................................... H04N 19/40
USPC .................................................... 375/240.02
See application file for complete search history.

(56) References Cited

U.S. PATENT DOCUMENTS

| | | | |
|---|---|---|---|
| 7,606,305 B1 | 10/2009 | Rault | |
| 2007/0081588 A1* | 4/2007 | Raveendran et al. | 375/240.1 |
| 2007/0092149 A1 | 4/2007 | Sung | |
| 2007/0201554 A1 | 8/2007 | Sihn | |
| 2008/0056354 A1 | 3/2008 | Sun et al. | |
| 2008/0101473 A1 | 5/2008 | Tanaka et al. | |
| 2010/0074326 A1 | 3/2010 | Sathianathan | |
| 2010/0074333 A1 | 3/2010 | Au et al. | |

OTHER PUBLICATIONS

Escribano et al ~ "Video Encoding and Transcoding Using Machine Learning" ~ MDM/KDD '08 ~ Aug. 2008 ~ pp. 53-62.

* cited by examiner

*Primary Examiner* — Mikhail Itskovich
(74) *Attorney, Agent, or Firm* — Wagner Blecher, LLP

(57) ABSTRACT

Adapting characteristics of a video stream. A source video stream is received comprising instructions to employ at least one reference frame at a video adaptation device, wherein the source video stream is encoded. The source video stream is adapted, at the video adaptation device, such that the instructions are adapted to store a different number of reference frames. A video stream is produced with the different number of the reference frames.

19 Claims, 6 Drawing Sheets

PROCESS
500

A video stream is received, at a video adaptation device, which employs a first reference frame.
502

A determination is made, at a video adaptation device, to splice the video stream to employ a second reference frame in place of the first reference frame.
504

The video stream is spliced, at a video adaptation device, to create a spliced video stream that employs the second reference frame.
506

The spliced video stream is produced, at a video adaptation device, to a client device to employ the spliced video stream with the second reference frame, wherein a copy of the second reference frame is stored at the client device.
508

PROCESS
200

A SOURCE VIDEO STREAM IS RECEIVED, AT A VIDEO ADAPTATION DEVICE, COMPRISING INSTRUCTIONS TO EMPLOY AT LEAST ONE REFERENCE FRAME WHEREIN THE SOURCE VIDEO STREAM IS ENCODED
202

THE SOURCE VIDEO STREAM IS PARTIALLY DECODED BEFORE THE ADAPTING THE SOURCE VIDEO STREAM OCCURS
204

THE SOURCE VIDEO STREAM IS ADAPTED, AT THE VIDEO ADAPTATION DEVICE, SUCH THAT THE INSTRUCTIONS ARE ADAPTED TO STORE A DIFFERENT NUMBER OF REFERENCE FRAMES
206

A FIELD IN A HEADER OF THE SOURCE VIDEO STREAM IS MODIFIED
208

A VIDEO STREAM IS PRODUCED WITH THE DIFFERENT NUMBER OF THE REFERENCE FRAMES
210

FIG. 2

PROCESS
500

A video stream is received, at a video adaptation device, which employs a first reference frame.
502

A determination is made, at a video adaptation device, to splice the video stream to employ a second reference frame in place of the first reference frame.
504

The video stream is spliced, at a video adaptation device, to create a spliced video stream that employs the second reference frame.
506

The spliced video stream is produced, at a video adaptation device, to a client device to employ the spliced video stream with the second reference frame, wherein a copy of the second reference frame is stored at the client device.
508

FIG. 5

ADAPTING A VIDEO STREAM

FIELD

Embodiments of the present invention relate generally to adapting a video stream.

BACKGROUND

Video streams may be transmitted and received using a variety of devices which may use a variety of different techniques and formats. A video stream may be packetized or otherwise sent as data over a network. During a transmission of a video stream there is a potential that an error may occur, for example the loss (erasure) of a packet. An error in a picture may propagate to future pictures due to temporal dependency. To compensate for these errors, error correction codes may be employed. However, error correction codes do not solve all problems associated with error propagation in a video stream.

BRIEF DESCRIPTION OF THE DRAWINGS

FIG. 2 illustrates a flowchart of an example method for adapting characteristics of a video stream in accordance with embodiments of the present technology.

FIG. 5 illustrates a flowchart of an example method for adapting characteristics of a video stream in accordance with embodiments of the present technology.

Figure 1:
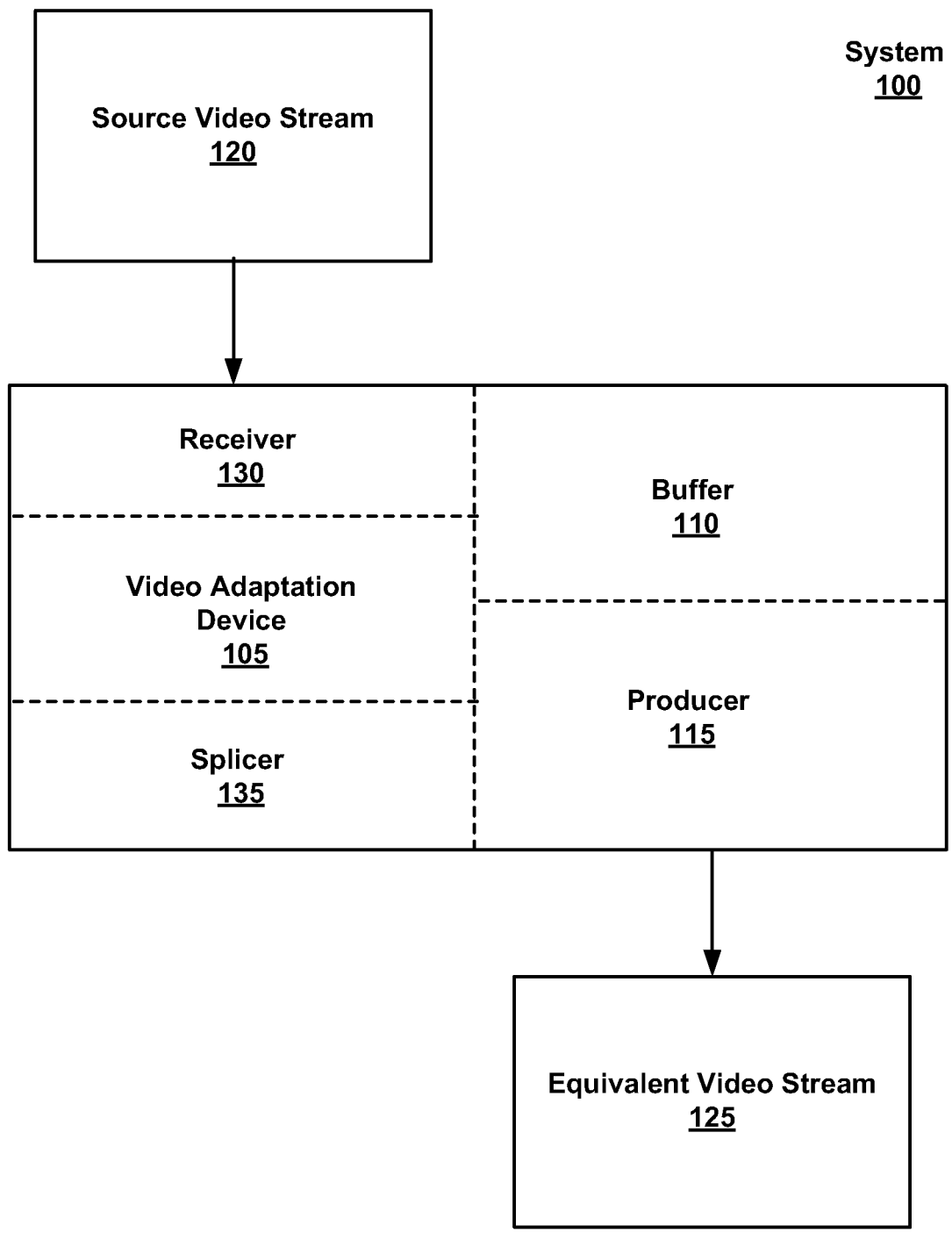
FIG. 1 illustrates a block diagram of an example video adaptation device in accordance with embodiments of the present technology.

The drawings referred to in this description of embodiments should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present description of embodiments, discussions utilizing terms such as "receiving", "storing", "adapting", "transmitting", "producing," "splicing," "sending," "encoding", "decoding", "modifying", or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. Embodiments of the present technology are also well suited to the use of other computer systems such as, for example, optical and mechanical computers.

Overview of Discussion

Video streams are stored and broadcast in a variety of formats with a variety of characteristics. A device may receive a video stream in a situation where the receiving device has no control over the characteristics of the video stream. Many devices used to encode video streams are hardware video encoders. Often a hardware video encoder encodes a video stream with specific characteristics. The hardware video encoder may not have the ability to alter or adapt the characteristics. One such characteristic may relate to the number of reference frames in a video stream. Many hardware video encoders employ only one reference frame for simplicity reasons. A device receiving a video stream from a hardware video encoder may have no control over the hardware video encoder to change the characteristics of the video stream that is being received.

In similar situations, a device may receive a video stream from a pre-recorded file. The device may receive the file as a video stream and have no control over the characteristics of the video stream as the characteristics have been pre-recorded.

Additionally, to properly decode a video stream, it is necessary to store those decoded pictures that are needed for decoding of future pictures. These stored pictures are also referred to as reference pictures or reference frames. A past decoded picture can be released (purged from buffer) after it is no longer needed for decoding future pictures. At its own choosing, a decoder can further delay releasing or simply not release past pictures. However, a reference decoder, i.e., a decoder provided as a working example of how to implement a compression standard, typically releases pictures as soon as possible, and many common decoder implementations follow this behavior. The number and identity of the reference frames retained by the decoder is determined from the instructions contained within the received video stream.

Embodiments of the present technology are for adapting a video stream. For example, a device may receive a video stream that comprises specific characteristics. Such a video stream may be received from a hardware video encoder, a file, or some other source in which the receiver has no control or only limited control over the characteristics of the video stream.

Many hardware video encoders employ a limited number of reference frames (e.g. one or two reference frames) for simplicity reasons. In some situations the limited number of reference frames may not be adjusted. Therefore, a receiver or other device that has no control over the source of the video stream may receive the video stream where the video stream comprises instructions for the receiver to employ only the limited number of reference frames. However, it may be desirable to have a larger number of reference frames in a live streaming situation, where reference picture selection or NEWPRED are known to be effective mechanisms to control temporal error propagation. Under NEWPRED, multiple reference frames, typically corresponding to a larger time duration than the round-trip-time between encoder and decoder, are employed so that both the encoder and decoder keep multiple reference frames, in contrast to one frame, in a buffer.

In a pure software implementation for which the source code is available, an encoder may be relatively easily reconfigured to employ multiple reference frames and to include instructions in the encoded stream that direct the decoder to keep the reference frames in a buffer. Nevertheless, hardware video encoders are becoming prevalent, and many hardware video encoders only employ one reference frame. In one approach, transcoding is employed to bridge the requirement gap in terms of the desired number of reference frames. A typical transcoding solution begins by first decoding to a pixel domain, and ends with a re-encoding (re-compression) into a video stream with the desired characteristics. This solution suffers from two important drawbacks. First, decoding and particularly encoding are computationally intensive. Second, typical transcoding incurs signal degradation since encoding is often lossy, in other words, some of the data may be lost. In contrast, embodiments of the present technology employ a lossless transcoder that accepts an input video compressed with a fixed number of reference frame(s), and produces an equivalent video that employs a larger number of reference frames. The conversion or adaptation requires little computation, does not require that the video stream be fully decoded and re-encoded and does not introduce any signal degradation.

In one embodiment, a video adaptation device receives a video stream which employs only one reference frame and comprises instructions describing how the video stream is to be decoded. By employing one reference frame, we mean that the video stream instructs the decoder to keep one reference frame in its buffer of decoded pictures, and is free to purge other decoded pictures. The one reference frame may or may not be subsequently used by the decoder to facilitate decoding, though typically it is. In such an embodiment, the video adaptation device may adapt or convert the video stream so that more than one reference frame is employed. In particular, the video stream with more than one reference frame is produced at a level of quality equivalent to the video stream before the adapting occurs.

Having a decoder or client device retain more reference frames can be beneficial for recovering from network problems that result in packet losses. When the number of reference frames is small, e.g., one or two, it is relatively easy for all the reference frames to be damaged by lost packets. When this happens, the decoder typically requires the encoder to supply an expensive (in terms of bandwidth) intra-coded frame to recover. In contrast, when the number N of reference frames is large (H.264 allows N up to 16), it is much less likely that all N reference frames are affected by errors, and a decoder can be reset to a useful state by having the encoder or a video adaptation device produce a predictively-coded frame, which is much more efficient than an intra-coded frame.

In one embodiment, the video adaptation device stores more than one reference frames in a buffer. The video stream is packetized and sent or transmitted to a client device. During the transmission, the client device may lose a packet or a packet may become damaged. The result of such an error may result in a lost or damaged reference frame. The client device may notify the video adaptation device of such an error. The video adaptation device may then "splice" the video stream so that the video stream is encoded based on a reference frame that the client device is known to have received and correctly decoded. By splicing, we mean the replacement of one or more compressed "slices" by other compressed replacement slices. In common video terminology, a slice is a fraction of a picture or a whole picture that is compressed as a unit. In one embodiment, the result of the splicing is a standards-compliant video stream, i.e., one that can be properly decoded by a reference decoder. The video adaptation device may initiate the splicing by retrieving the reference frame that the client device is known to have received from the buffer associated with the video adaptation device, and performing selective encoding to produce the replacement slice(s). Thus an error based on a reference frame that was lost or damaged at the client device does not itself propagate, but is replaced by a lesser error which results in smaller degree of drift error propagation. Such methods have the advantage of avoiding large error propagation while using techniques that are less computationally intensive than solutions in the prior art.

Embodiments of the present technology invoke an encoder to adapt a video stream only on demand. Advantages of this strategy include allowing introduction of effective error resilience methods such as intra-coding and reference-picture-selection to video after it has already been compressed, as might occur in low-delay streaming of stored content. In one embodiment, input video and output video are identical for most compressed pictures except for some changes in the slice headers and the replacement of a few frames via re-encoding.

The following discussion will demonstrate various hardware, software, and firmware components that are used with and in devices and computer systems used for receiving, adapting, converting, modifying, storing, transmitting, producing, splicing and sending video streams using various embodiments of the present technology. Furthermore, the devices, computer systems and their methods may include some, all, or none of the hardware, software, and firmware components discussed below.

Embodiments of Adapting a Video Stream

With reference now to FIG. 1, a block diagram of an example system comprising a video adaptation device shown in accordance with embodiments of the present technology. System 100 includes video adaptation device 105, buffer 110, producer 115, source video stream 120, equivalent video stream 125, receiver 130, and splicer 135. System 100 comprises components that may or may not be used with different embodiments of the present technology and should not be construed to limit the present technology.

In one embodiment, video adaptation device 105 is a hardware device configured to receive source video stream 120, at receiver 130, comprising instructions to store at least one reference frame, wherein the video stream is encoded, and is further configured to adapt source video stream 120 such that the instructions are adapted to store a number of reference frames different from the number of reference frames employed by source video stream 120.

In one embodiment, the source video stream 120 is adapted so that the video adaptation device 105 will employ more than one reference frame when required to avoid propagating errors. The number of reference frames stored in buffer 110 may be a default number or may be configured by a user. Additionally the number of reference frames employed by video adaptation device 105 to adapt source video stream 120 may dynamically change while video adaptation device 105 is receiving and adapting source video stream 120. It should be appreciated that the present technology may be practiced without the use of a buffer.

In principle, compressed videos are instructions for a decoder to reconstruct video frames. When one reference frame is employed in a video stream, the instructions in the compressed video instruct the decoder to only keep one reference frame in buffer, and also additional instructions describe to the decoder how to derive the current decoded frame from the reference frame. Embodiments of the present technology adapt the video stream so that it instructs a decoder to retain N (where N>1) reference frames. In one embodiment, the video stream is adapted to instruct the decoder to keep the last N frames in the buffer, but only actually use the last reference frame when decoding. For example, video adaptation device 105 may be a mid network node that receives source video stream 120 at receiver 130, adapts source video stream 120 to equivalent video stream 125 and produces equivalent video stream 125 and then transmits or sends equivalent video stream 125 to another decoder which may actually display a video. In one embodiment, the requirement is that these changes need to be expressible using bit-stream syntax of the relevant standard (e.g., H.264). H.264 is a video coding standard also know in the art as MPEG-4 part 10 or Advanced Video Coding (AVC).

It should be noted that when N reference frames are employed, they are not restricted to be the last N decoded frames, even though that is commonly the case. In particular, H.264 has the notion of a "long term reference", where a past decoded frame can be chosen to remain as one of the N references for any number of future frames. Similarly, H.264 also allows the specification of frames that will not be used as reference for future frames. In H.264, the management of reference frames is achieved via explicit commands called "memory management control operations" that are transmitted as part of the bit-stream.

In one embodiment, the instructions of source video stream 120 are adapted to comprise instructions to store a subset of the reference frames wherein the subset comprises an original reference frame employed by said source video stream. In one embodiment, the subset of reference frames are stored in an order employed by source video stream 120.

In one embodiment, video adaptation device 105 uses well known transcoding techniques to process source video stream 120. Source video stream 120 may be thereby adapted to create equivalent video stream 125. In one embodiment, video adaptation device 105 only partially decodes source video stream 120 and only partially encodes equivalent video stream 125. In other words, video adaptation device 105 may be considered a reduced-complexity transcoding device; less computational resources are used and time is saved compared to a system in which the source video stream 120 is fully decoded and fully re-encoded. In one embodiment, video adaptation device 105 transcodes source video stream 120 to create equivalent video stream 125 wherein equivalent video stream 125 employs more reference frames than source video stream 120 while transcoding is performed losslessly implying that source video stream 120 and equivalent video stream 125 are of an equivalent quality. Additionally, equivalent video stream 125 can be used in conjunction with common methods such as reference picture selection or NEWPRED to control temporal error propagation. NEWPRED is known in the art as a method used to prevent the propagation of transmission errors in real-time video communication.

In one embodiment, source video stream 120 is in a compressed format. In such an embodiment, video adaptation device 105 would decompress or partially decompress source video stream 120. In one embodiment, source video stream 120 and equivalent video stream 125 are in an H.264 video format. In one embodiment, source video stream 120 is adapted by video adaptation device 105 by modifying one or more fields in a header of source video stream 120. In one embodiment, modifying one or more fields in the header of source video stream 120 may further comprise modifying a sequence parameter set of the header. In one embodiment, source video stream 120 is adapted using Golomb coding.

In the embodiment employing H.264, the adapting may involve two changes to the characteristics of compressed video. The first change is in the explicit "num_ref_frames" field in the header of "sequence-parameter-set", which specifies the number of reference frames employed. The process involves detection of "sequence-parameter-set", syntax decoding of "sequence-parameter-set", and replacing the "num_ref_frames" field with the desired value coded using Golomb coding. Golomb coding is a technique known in the art and is a lossless data compression method. A second change may be necessary when the changes in "sequence-parameter-set" change how subsequent compressed bits are interpreted. Specifically, when one reference frame is employed, it is not necessary in H.264 to specify the index of the reference frame. When the number of references frame is larger than one, such specification becomes necessary. Thus, when the adapting changes the number of reference frames from one to a number larger than one, the second change may be needed.

Embodiments of the second change can be losslessly performed in two ways. In a first method, the embodiment will overwrite the "num_ref_idx_active_override_flag" to be "1" to signify that not all available reference frames are used. The embodiment then specifies "num_ref_idx_l0_active_minus1" to be "0" to indicate that only one reference frame is active. In the second method, the embodiment does not modify the slice header, but instead, for every block that is inter-predicted, the embodiment explicitly adds the "ref_idx_l0" value with a value of "0" to specify that only the last frame should be used. It should be noted that both embodiments can also be used to extend the number of reference frames when the input has more than 1 reference frame.

In various embodiments, when a source video stream with N reference frames is adapted to have M reference frames (M>N), it is in general possible that the N original reference frames are not the most recent N decoded frames. In such cases, care must be taken to ensure that the N original reference frames remain in the new set of M reference frames. In H.264 there is syntax for "reference list reordering", which instructs the decoder to reorder the frames in the reference list. By using this syntax, in one embodiment the decoder is instructed to keep the N frames at the head of the reference list in the equivalent video stream 125 to match the N frames the in reference list in the source video stream 120. In one method, in addition to reference list reordering, the location of the correct reference frames on a per-block basis is explicitly signaled. This method may require the video syntax to be parsed and rewritten on a per-coding-block basis. In a second method, in addition to reference list reordering, the header is rewritten to specify "num_ref_idx_l0_active_minus1" to be "0".

In one embodiment, video adaptation device 105 operates by adapting P-frames and P-slices of source video stream 120 which may be employed for real-time communications. In one embodiment, video adaptation device 105 operates by adapting B-frames and B-slices of source video stream 120, which are less often employed for real-time communications but are frequently employed when video is stored in files. The lossless transcoding can be achieved for videos with B frames using techniques similar to those discussed above in reference to H.264 video format.

An advantage of the present technology is that it may be relied upon as a component for a real-time streaming system that relies on generic hardware encoders and generic decoders. Another advantage is that the present technology may be implemented using commodity hardware for the adapting or converting of the video stream using syntax parsing.

In one embodiment, the video adaptation device stores more than one reference frame in buffer 110. The video stream is sent or transmitted to a client device such as client device 305 of FIG. 3. The client device receives the video stream stores the reference frames associated with the video stream. During the transmission, the client device may encounter an error resulting in the loss of a reference frame. The reference frame may be lost during transmission or may be otherwise damaged. The client device may notify video adaptation device 105 of such an error. Video adaptation device 105 then determines the last reference frame known to be received and correctly decoded by the client device. For example, the client device may notify video adaptation device 105 of the last complete reference frame received and decoded by the client device. In one embodiment, video adaptation device 105 determines that the reference frame sent prior to the lost reference is the last complete reference frame received and correctly decoded by the client device. In one embodiment, the client device notifies a control unit of errors. The control unit processes the error messages and issues commands and informational messages to the video adaptation device 105. In one embodiment, the network path to and from the client device may pass through mid-network nodes that perform additional processing and may themselves be video adaptation devices or may issue indications of errors.

In one embodiment, video adaptation device 105 then instructs splicer 135 to splice or encode the video stream so that the video stream is encoded based on the reference frame that the client device is known to have received. In one embodiment, splicer 135 retrieves the last reference frame known to be received by the client device from buffer 110, thus demonstrating the advantage of storing a number of reference frames in buffer 110 to be employed by splicer 135 to avoid error propagation. The video stream modified by splicer 135 is then sent or transmitted to the client device. The client device may employ the reference frames it has stored, which include the reference frame known to be received by the client device, to decode the video stream. In this manner, errors based on a lost or damage reference frame are prevented from being propagated in the video stream.

The end result of the present technology is that effective error-control methods may be widely deployed with generic hardware encoders. For example, if frame K1 is lost at a decoder, this information is related to an encoder, which may receive the notification when it is encoding frame K2 (where K2>K1). Such an encoder can be located as a component device near video adaptation device 105 or may be part of video adaptation device 105. If the number of references frame used (kept in buffer at the decoder) is larger than K2-K1, the encoder can simply encode frame K2 using frame K1-1 as reference and mitigate error propagation. Per the instructions in the equivalent video stream 125, the decoder has frame K1-1 in its reference buffer and can successfully decode K2.

Figure 3:
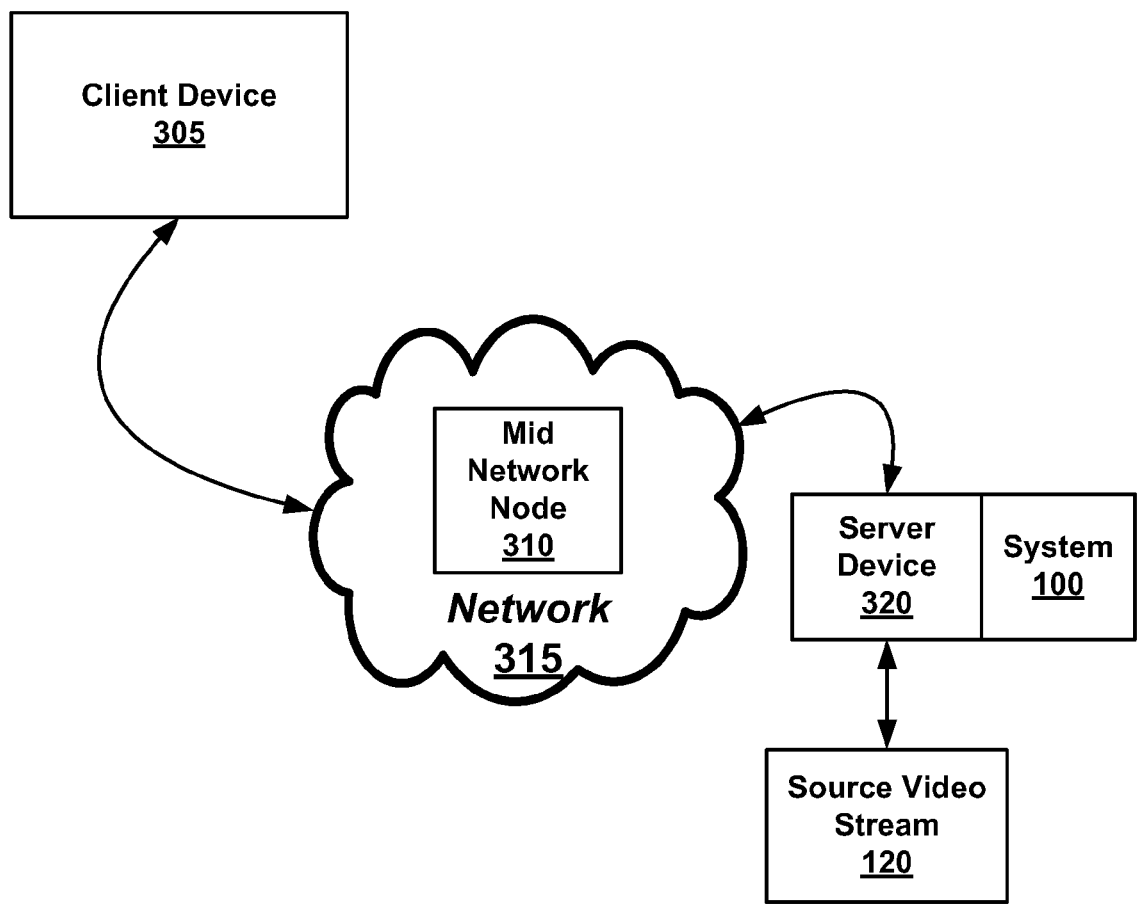
FIG. 3 illustrates a block diagram of example video adaptation devices in accordance with embodiments of the present technology.

With reference now to FIG. 3, a block diagram of an example environment comprising video adaptation devices is shown in accordance with embodiments of the present technology. Environment 300 depicts client device 305, mid network node 310, network 315, server device 320, system 100 and source video stream 120. Environment 300 comprises components that may or may not be used with different embodiments of the present technology and should not be construed to limit the present technology.

FIG. 3 is drawn to depict, in one embodiment, system 100 and server device 320 as part of one device. In one embodiment, system 100 contains all the components and features of system 100 of FIG. 1 which comprises video adaptation device 105, buffer 110, producer 115, and receiver 130. It should be appreciated that system 100 and server device 320 may or may not be part of the same device. It should be appreciated that system 100 may be located physically near a mid network node, a client device or a hardware device that produces the source video stream. In this manner, system 100 may accomplish its tasks at a variety of locations.

In one embodiment, source video stream 120 is the same source video stream of FIG. 1. Source video stream 120 may be created by a hardware encoding device, for example a webcam or an add-on encoding card, or may be taken from a source file and may have a limited number of reference frames. In one embodiment, neither server device 320, mid node network 310 nor system 100 have control over source video stream 120 to change the characteristics or encoding of source video stream 120 before it reaches mid node network 310 or system 100.

In one embodiment, server device 320 is a server computer system that receives source video stream 120. In one embodiment, server device 320 is combined with system 100 into one device. In one embodiment, server device 320 and system 100 are distinct devices operating in co-operation with each other. In these embodiments, system 100 would operate to store more than one reference frame in a buffer, source video stream 120 may then be adapted using the more than one reference frame to mitigate error propagation by client device 305. An adapted video stream would then be relayed to client device 305 through network 315. In such an embodiment, environment 300 may not include mid network node 310. In one embodiment, client device 305 is a computer system capable of displaying a video stream.

In one embodiment, environment 300 does not include system 100 and mid network node 310 performs the actions of system 100. In such an embodiment, source video stream 120 may be relayed from server device 320 to mid network node 310 without any changes to the number of reference frames or to the characteristics of source video stream 120. Mid network node 310 would then operate to adapt characteristics of source video stream 120 to change a number of reference frames associated with the mid network node 310. The adapted video stream would then be transmitted to client device 305 where client device 305 would be instructed by the characteristics of the adapted video stream to store the adapted number of reference frames.

In one embodiment, client device 305 is configured to provide feedback regarding errors in the video stream to either mid network node 310, server device 320 or system 100. The feedback may then be employed by either mid network node 310, server device 320 or system 100 to remedy the error. For example, if frame K1 is lost at client device 305, this information is related to either mid network node 310, server device 320 or system 100 which may receive the feedback when it is encoding frame K2 (where K2>K1). If the number of references frame kept in the buffer associated with the encoder is larger than K2-K1, then the encoder can simply encode frame K2 using frame K1-1 as reference and mitigate propagating errors. Client device 305 would have frame K1-1 stored in a buffer because it was instructed to do so by the adapted video stream. Client device 305 may then use frame K1-1 to decode and display the video stream without errors.

Figure 6:
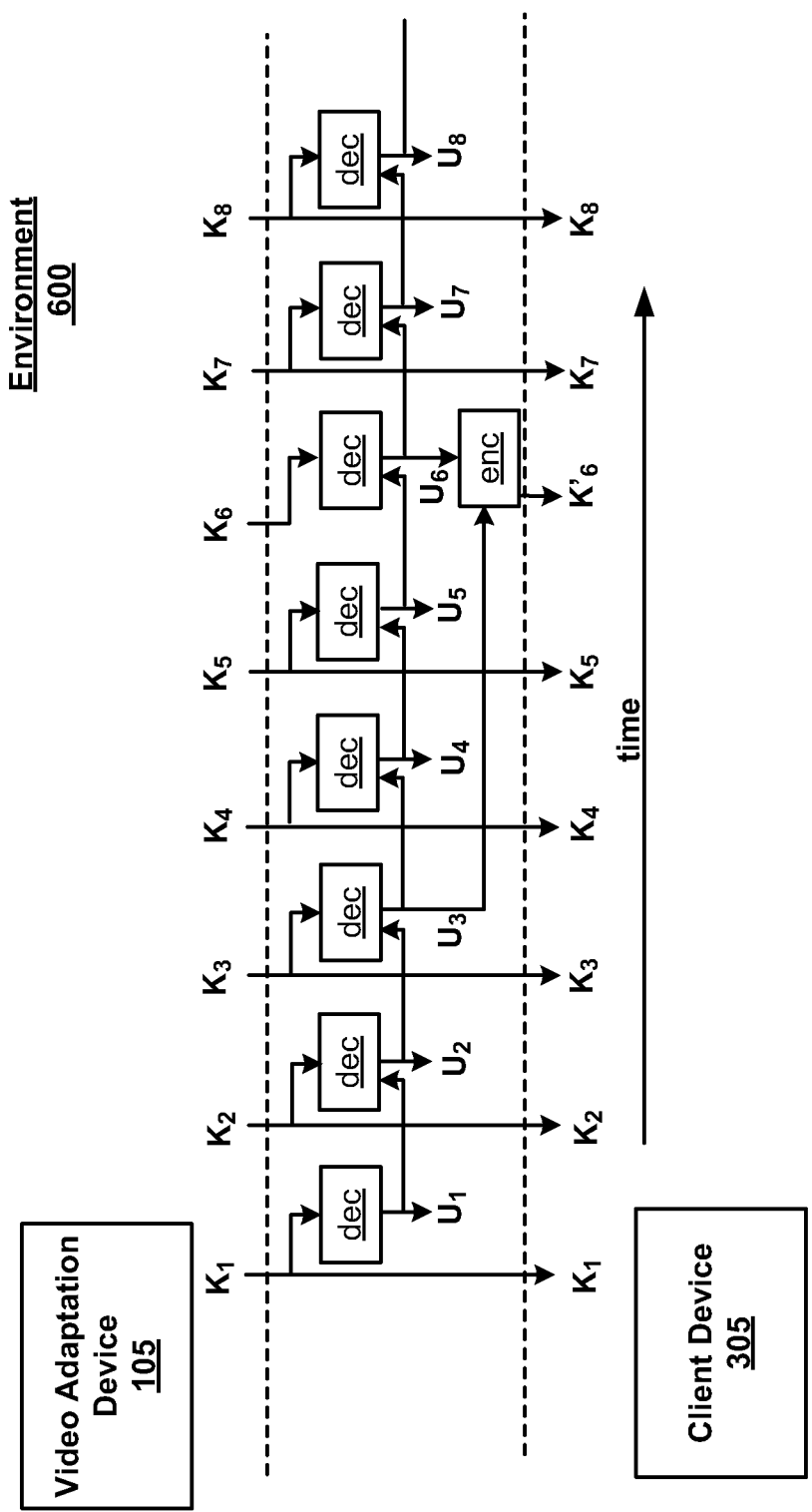
FIG. 6 illustrates a block diagram of example video adaptation devices in accordance with embodiments of the present technology.

With reference now to FIG. 6, a block diagram of an example environment comprising a video adaptation device shown in accordance with embodiments of the present technology. Environment 600 includes video adaptation device 105, client device 305, decoding blocks, encoding blocks, uncompressed frames $U_i$ and compressed frames $K_i$. Environment 600 comprises components that may or may not be used with different embodiments of the present technology and should not be construed to limit the present technology.

Generally, environment 600 depicts an example of a simple replacement of frame $K_i$ by another frame $K_i'$ produced by an encoder where $K_i'$ is based on a previously stored reference frame. In one embodiment, both video adaptation device 105 and client device 305 have access to the previously stored reference frame.

FIG. 6 also depicts an example of encoding using frame $K_6'$. In such an example, the previous frame is $U_3$, while the decoder will have in its decoded buffer a corrupt version of $U_5$ as the previous frame. In one embodiment, a splicing operation is employed to create frame $K_6'$ and must harmonize differences between frame $U_3$ and $U_5$ by adding video syntax elements that register new coding parameters if necessary, rewrite coded frame numbers, and specify how reference frames should be interpreted via "reference picture reordering" syntax. These are light-weight operations involving rewriting video headers only.

It should be noted that the replacement frame $K_i'$ decodes only to a close approximate picture of frame $U_i$, not a perfect copy of frame $U_i$. As such, some small drift error remains and can propagate over time. Generally, though, such small differences do not cause visible drift on the time scale of 10 seconds, after which any drift is likely to be cleared by an intra-frame in the original video.

Operation

More generally, in embodiments in accordance with the present invention, adapting a video stream is utilized to avoid propagating errors in a video stream. Such methods can be implemented at mid-network nodes as an approach to effectively using video streams from a generic hardware encoder that does not have the ability to change its settings.

FIG. 2 is a flowchart illustrating process 200 for adapting a video stream, in accordance with one embodiment of the present invention. In one embodiment, process 200 is carried out by processors and electrical components under the control of computer readable and computer executable instructions stored on a computer-usable storage medium. The computer readable and computer executable instructions reside, for example, in data storage features such as computer usable volatile and non-volatile memory. However, the computer readable and computer executable instructions may be non transitory and may reside in any type of computer-usable storage medium. In one embodiment, process 200 is performed by system 100 of FIG. 1.

In one embodiment, process 200 is used to adapt a video stream. It should be appreciated that the steps of process 200 may not need to be executed in the order they are listed in. Additionally, embodiments of the present technology do not require that all of the steps of process 200 be executed to adapt a video stream. At 202, in one embodiment, a source video stream is received, at a video adaptation device, comprising instructions to store at least one reference frame wherein the source video stream is encoded. For example, the video adaptation device may be video adaptation device 105 of FIG. 1 with all of the abilities and features described above.

At 204, in one embodiment, the source video stream is partially decoded before the adapting the source video stream occurs. In one embodiment, this partial decoding is performed at video adaptation device 105 of FIG. 1. In one embodiment, partial decoding comprises syntax decoding. The video stream may then later be re-encoded, partially re-encoded, or produced without additional encoding. In one embodiment, the re-encoding may output a video stream that conforms to a compression standard. For example, the output video stream may conform to the H.264 video format.

At 206, in one embodiment, the source video stream is adapted, at the video adaptation device, such that the instructions are adapted to store a different number of reference frames. Techniques for such adaptations are described above.

At 208, in one embodiment, a field in a header of the source video stream is modified.

At 210, in one embodiment, a video stream is produced with the different number of the reference frames. In one embodiment, the video stream may be produced by producer 115 of FIG. 1. The video stream may then be sent or transmitted to another location.

FIG. 5 is a flowchart illustrating process 500 for adapting a video stream, in accordance with one embodiment of the present invention. In one embodiment, process 500 is carried out by processors and electrical components under the control of computer readable and computer executable instructions stored on a computer-usable storage medium. The computer readable and computer executable instructions reside, for example, in data storage features such as computer usable volatile and non-volatile memory. However, the computer readable and computer executable instructions may be non transitory and may reside in any type of computer-usable storage medium. In one embodiment, process 500 is performed by system 100 of FIG. 1 or environment 300 of FIG. 3.

In one embodiment, process 500 is used to adapt a video stream. It should be appreciated that the steps of process 500 may not need to be executed in the order they are listed in. Additionally, embodiments of the present technology do not require that all of the steps of process 500 be executed to adapt a video stream. At 502, a video stream is received, at a video adaptation device, which employs a first reference frame. For example, the video adaptation device may be video adaptation device 105 of FIG. 1.

At 504, a determination is made, at a video adaptation device, to splice the video stream to employ a second reference frame in place of the first reference frame. In one embodiment, such a determination is completed upon receiving a command to make the determination. In one embodiment, such a determination further comprises receiving an error message regarding the first reference frame. For example, the error message could come from a client device that a packet was lost or damage and therefore a reference frame is unusable.

At 506, the video stream is spliced, at a video adaptation device, to create a spliced video stream that employs the second reference frame. In one embodiment, the splicing comprises replacing a compressed slice with a replacement compressed slice. In one embodiment, the splicing comprises adjusting a frame number of said replacement compressed slice to match a frame number of said compressed slice. In one embodiment, the splicing comprises adjusting the replacement compressed slice to change a position of said second reference frame in a reference frame buffer.

In one embodiment, the spliced video stream conforms to a video standard. For example, the video standard could be a compressed video standard or H.264. In one embodiment, the splicing comprises incorporating compression parameters into the spliced video stream. In one embodiment, the splicing comprises encoding a slice of said video stream using the second reference frame. In one embodiment, the splicing the video stream comprises retrieving the second reference frame from a buffer associated with the video adaptation device.

At 508, the spliced video stream is produced, at a video adaptation device, to a client device to employ the spliced video stream with the second reference frame, wherein a copy of the second reference frame is stored at the client device.

One technique for practicing the present technology is outlined below. Compressed bits and decoded pixels of picture 0 are denoted using the conventions B(0) and P(0), respectively, with similar notations for all frames. A decoder may simply perform: P(0)=decode(B(0)) then P(1)=decode (B(1), B(0)). In other words, P(n)=decode(B(n), . . . , B(0)).

Commonly, the dependency of P(n) on older frames can be summarized by the decoded pixels of a finite number of past frames. E.g., if only the last two frames are used for reference, then: P(n)=decode(B(n), P(n-1), P(n-2)).

In one embodiment, a common case may be one in which only the last frame is used for reference. This can be described as: P(0)=decode(B(0)) or P(k)=decode(B(k), P(k-1)) and P(n)=decode(B(n), P(n-1)).

In one embodiment, B(k) is lost at the receiver, and such knowledge is eventually related to the sender with some delay, and the sender is about to transmit a later compressed video frame B(n). Then the sender knows that the receiver will experience corrupt picture for P(k) and later frames. The goal is to replace B(n) by a replacement B*(n) that stops error propagation. This can be achieved by one of two methods which we call "intra method" and "inter method".

Intra Method

In this method, intra coding is employed on the decoded pixels P(n) to obtain B'(n). This may be explained as B'(n)=intra_encode(P(n)).

In such a way, earlier errors can be eliminated if B'(n) is properly decoded. For B'(n) to be properly decoded, it is important to perform the following transformation: B*(n)= splice_preparation(B'(n)) to allow properly splicing of B*(n). It should be appreciated that in this context splicing means inserting B*(n) into the sequence B*(n), B(n-1), . . . , B(k+1), B(k-1), . . . so that it is decodable by a decoder. Several steps may be involved. First, if intra_encode( ) is using different coding parameters specified in the "sequence parameter set" or the "picture parameter set" than the B(n), then it is necessary to register the new parameter sets by (1) give them new parameter set id that is not in use, and (2) incorporating them into B*(n). Second, since the encoder is invoked only when necessary, it may use different picture numbers than the original video. In this embodiment, it is necessary to rewrite the picture number (or "frame_num") of B'(n) to match that of B(n).

There are several noteworthy characteristics of intra_encode( ). First re-encoding is not always performed, but is only invoked on demand. Second, decode(B*(n), P(n-1)) is close to, but generally not exactly P(n) due to the lossy nature of intra_encode( ).

Inter Method

In one embodiment, the inter method is more efficient compared to intra coding which is demonstrated as follows.

B'(n)=inter_encode(P(n), P(k-1)) where the first and second arguments to inter_encode() represent the target and reference pictures, respectively. Here, this inter_encode() method keeps and uses only one reference frame. The same splice_preparation procedures as in Intra-method need to be applied.

B*(n)=splice_preparation(B'(n)). Nevertheless, a further complication needs to be addressed. Specifically, B'(n) is decoded correctly when the previous decoded picture is P(k-1), but a decoder that receives the sequence B(n-1), . . . , B(k+1), B(k-1) will have as last decoded picture a corrupted version of P(n-1). This can be overcome by adding a "reference picture reordering" command in B*(n). Specifically, the method explicitly specifies the frame gap n-k in that syntax to instruct a standard decoder to search further back to locate the frame: if (currSlice->slice_type!=I_SLICE && currSlice->slice_type!=SI_SLICE)

```
{
    currSlice->adaptive_ref_pic_buffering_flag = 0;
    currSlice->ref_pic_list_reordering_flag[LIST_0] = 1;
    currSlice->reordering_of_pic_nums_idc[LIST_0][0] = 0;
    currSlice->abs_diff_pic_num_minus1[LIST_0][0] = currFrame->frame_num - refFrame->frame_num - 1;
    currSlice->reordering_of_pic_nums_idc[LIST_0][1] = 3;
}
```

Another variation of inter encode method is to use an inter encode method with sufficient reference frames: B'(n)=inter_encode2(P(n), 0, 0, . . . , P(k-1)). As before, the first argument is the target picture, and the rest are reference pictures. In inter_encode2, even though it has many theoretical reference frames, only P(k-1) is selected to serve as reference for encoding. This has the advantage that we can skip the addition of "reference picture reordering" syntax, but is more difficult to implement.

Again, encoding is incurred only on demand, and generally B'(n) produce a good approximation that is practically good enough.

Example Computer System Environment

Figure 4:
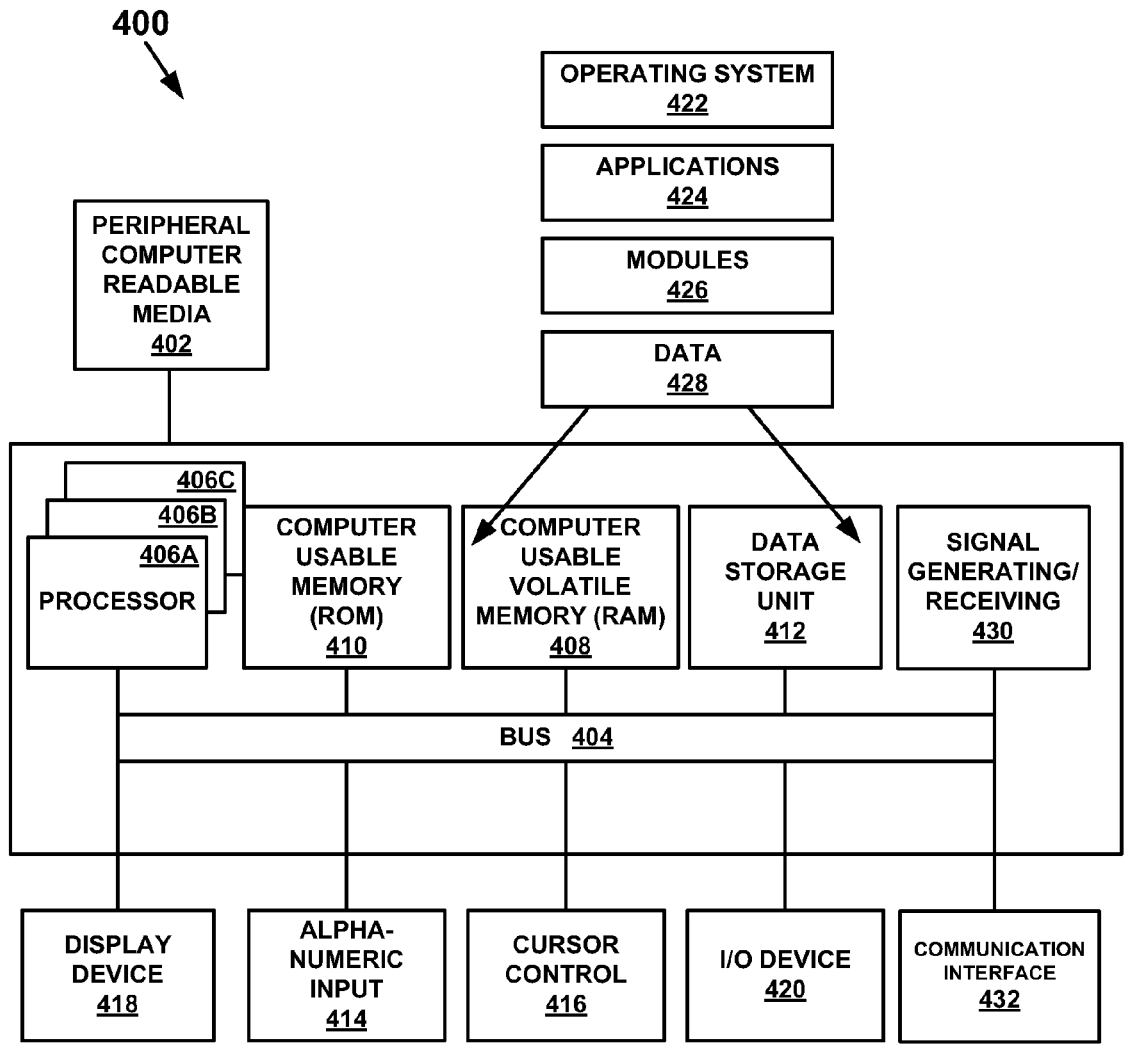
FIG. 4 illustrates a diagram of an example computer system upon which embodiments of the present technology may be implemented.

With reference now to FIG. 4, portions of the technology for providing a communication composed of computer-readable and computer-executable instructions that reside, for example, in computer-usable media of a computer system. That is, FIG. 4 illustrates one example of a type of computer that can be used to implement embodiments of the present technology. FIG. 4 represents a system or components that may be use in conjunction with aspects of the present technology. In one embodiment, some or all of the components of FIG. 1 or FIG. 3 may be combined with some or all of the components of FIG. 4 to practice the present technology.

FIG. 4 illustrates an example computer system 400 used in accordance with embodiments of the present technology. It is appreciated that system 400 of FIG. 4 is an example only and that the present technology can operate on or within a number of different computer systems including general purpose networked computer systems, embedded computer systems, routers, switches, server devices, user devices, various intermediate devices/artifacts, stand alone computer systems, mobile phones, personal data assistants, televisions and the like. As shown in FIG. 4, computer system 400 of FIG. 4 is well adapted to having peripheral computer readable media 402 such as, for example, a floppy disk, a compact disc, and the like coupled thereto.

System 400 of FIG. 4 includes an address/data bus 404 for communicating information, and a processor 406A coupled to bus 404 for processing information and instructions. As depicted in FIG. 4, system 400 is also well suited to a multi-processor environment in which a plurality of processors 406A, 406B, and 406C are present. Conversely, system 400 is also well suited to having a single processor such as, for example, processor 406A. Processors 406A, 406B, and 406C may be any of various types of microprocessors. System 400 also includes data storage features such as a computer usable volatile memory 408, e.g. random access memory (RAM), coupled to bus 404 for storing information and instructions for processors 406A, 406B, and 406C.

System 400 also includes computer usable non-volatile memory 410, e.g. read only memory (ROM), coupled to bus 404 for storing static information and instructions for processors 406A, 406B, and 406C. Also present in system 400 is a data storage unit 412 (e.g., a magnetic or optical disk and disk drive) coupled to bus 404 for storing information and instructions. System 400 also includes an optional alphanumeric input device 414 including alphanumeric and function keys coupled to bus 404 for communicating information and command selections to processor 406A or processors 406A, 406B, and 406C. System 400 also includes an optional cursor control device 416 coupled to bus 404 for communicating user input information and command selections to processor 406A or processors 406A, 406B, and 406C. System 400 of the present embodiment also includes an optional display device 418 coupled to bus 404 for displaying information.

Referring still to FIG. 4, optional display device 418 of FIG. 4 may be a liquid crystal device, cathode ray tube, plasma display device or other display device suitable for creating graphic images and alpha-numeric characters recognizable to a user. Optional cursor control device 416 allows the computer user to dynamically signal the movement of a visible symbol (cursor) on a display screen of display device 418. Many implementations of cursor control device 416 are known in the art including a trackball, mouse, touch pad, joystick or special keys on alpha-numeric input device 414 capable of signaling movement of a given direction or manner of displacement. Alternatively, it will be appreciated that a cursor can be directed and/or activated via input from alpha-numeric input device 414 using special keys and key sequence commands.

System 400 is also well suited to having a cursor directed by other means such as, for example, voice commands. System 400 also includes an I/O device 420 for coupling system 400 with external entities. For example, in one embodiment, I/O device 420 is a modem for enabling wired or wireless communications between system 400 and an external network such as, but not limited to, the Internet. A more detailed discussion of the present technology is found below.

Referring still to FIG. 4, various other components are depicted for system 400. Specifically, when present, an operating system 422, applications 424, modules 426, and data 428 are shown as typically residing in one or some combination of computer usable volatile memory 408, e.g. random access memory (RAM), and data storage unit 412. However, it is appreciated that in some embodiments, operating system 422 may be stored in other locations such as on a network or on a flash drive; and that further, operating system 422 may be accessed from a remote location via, for example, a coupling to the internet. In one embodiment, the present technology, for example, is stored as an application 424 or module 426 in memory locations within RAM 408 and memory areas within data storage unit 412. The present technology may be applied to one or more elements of described system 400. For example, a method of modifying user interface 225A of device 115A may be applied to operating system 422, applications 424, modules 426, and/or data 428.

System 400 also includes one or more signal generating and receiving device(s) 430 coupled with bus 404 for enabling system 400 to interface with other electronic devices and computer systems. Signal generating and receiving device(s) 430 of the present embodiment may include wired serial adaptors, modems, and network adaptors, wireless modems, and wireless network adaptors, and other such communication technology. The signal generating and receiving device(s) 430 may work in conjunction with one or more communication interface(s) 432 for coupling information to and/or from system 400. Communication interface 432 may include a serial port, parallel port, Universal Serial Bus (USB), Ethernet port, antenna, or other input/output interface. Communication interface 432 may physically, electrically, optically, or wirelessly (e.g. via radio frequency) couple system 400 with another device, such as a cellular telephone, radio, or computer system.

The computing system 400 is only one example of a suitable computing environment and is not intended to suggest any limitation as to the scope of use or functionality of the present technology. Neither should the computing environment 400 be interpreted as having any dependency or requirement relating to any one or combination of components illustrated in the example computing system 400.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

Although the subject matter is described in a language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method for adapting characteristics of a video stream, the method comprising:
   receiving, at a video adaptation device, a source video stream comprising instructions to employ at least one reference frame, wherein said source video stream is encoded;
   adapting said source video stream, at said video adaptation device, such that said instructions are adapted to employ a different number of reference frames, wherein said source video stream is only partially decoded before said adapting; and
   producing an output video stream, at a video adaptation device, with said adapted instructions to employ said different number of said reference frames, wherein said producing does not require complete re-encoding.

2. The method of claim 1 wherein said producing said output video stream occurs at a level of quality equivalent to said source video stream.

3. The method of claim 1 wherein said receiving said source video stream further comprises receiving a video stream in an H.264 video format.

4. The method of claim 1 wherein said adapting of said source video stream outputs said output video stream conformant to a compression standard.

5. The method of claim 1 wherein said adapting said source video stream further comprises:
   modifying a field in a header of said source video stream.

6. The method of claim 1 wherein said receiving and said adapting said source video stream occurs at said video adaptation device which is located physically near a hardware device that produces said source video stream.

7. The method of claim 1 wherein said receiving and said adapting said source video stream occurs at said video adaptation device which is located physically near a mid network node.

8. The method of claim 1 wherein said receiving and said adapting said source video stream occurs at said video adaptation device which is located physically near a client device.

9. A system for adapting a video stream, said system comprising:
   a receiver configured to receive a source video stream comprising instructions to employ at least one reference frame wherein said source video stream is encoded;
   a video adaptation device configured to adapt said source video stream such that said instructions are adapted to employ a different number of reference frames, wherein said source video stream is only partially decoded before being adapted; and
   a producer configured to produce an output video stream with said different number of said reference frames, wherein said producer is not required to perform complete re-encoding to produce said output video stream.

10. The system of claim 9 wherein said video adaptation device is further configured to adapt said instructions of said source video stream to comprise instruction to employ a subset of said reference frames wherein said subset comprises an original reference frame employed by said source video stream.

11. The system of claim 10 wherein said subset of said reference frames are stored in an order employed by said source video stream.

12. The system of claim 9 wherein said video adaptation device is a mid network node.

13. The system of claim 9 wherein said video adaptation device is a server computer system.

14. The system of claim 9 wherein said source video stream is an H.264 video format.

15. The system of claim 9 wherein said video adaptation device is further configured to modify a said field in a field in a header of said source video stream.

16. The system of claim 9 wherein said producer is further configured to output said output video stream with said different number of said reference frames conformant to a compression standard.

17. A non-transitory computer-usable storage medium having instructions embodied therein that when executed cause a computer system to perform a method for adapting a video stream, said method comprising:
   receiving a source video stream comprising instructions to employ at least one reference frame, wherein said source video stream is encoded;
   adapting said source video stream such that said instructions are adapted to employ a different number of reference frames, wherein said source video stream is only partially decoded before said adapting; and
   producing an output video stream with said adapted instructions to employ said different number of said reference frames, wherein said producing does not require complete re-encoding.

18. The non-transitory computer-usable storage medium of claim 16 wherein said instructions of said source video stream are adapted to comprise instruction to employ a subset of said reference frames wherein said subset comprises an original reference frame employed by said source video stream.

19. The non-transitory computer-usable storage medium of claim 17 wherein said subset of said reference frames are stored in an order employed by said source video stream.

* * * * *